US009094356B2

(12) United States Patent
Carlson et al.

(10) Patent No.: US 9,094,356 B2
(45) Date of Patent: Jul. 28, 2015

(54) SUPPLEMENTAL ALERT SYSTEM AND METHOD

(71) Applicant: Visa International Service Association, San Francisco, CA (US)

(72) Inventors: Mark Carlson, Half Moon Bay, CA (US); Ayman Hammad, Pleasanton, CA (US); Ashley Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 197 days.

(21) Appl. No.: 13/714,161

(22) Filed: Dec. 13, 2012

(65) Prior Publication Data

US 2013/0159446 A1   Jun. 20, 2013

Related U.S. Application Data

(60) Provisional application No. 61/576,314, filed on Dec. 15, 2011.

(51) Int. Cl.
*H04L 12/58* (2006.01)
*H04L 29/06* (2006.01)

(52) U.S. Cl.
CPC ............ *H04L 51/24* (2013.01); *H04L 63/0892* (2013.01); *H04L 65/403* (2013.01)

(58) Field of Classification Search
CPC .............. H04L 12/588; H04L 41/0604; H04L 41/0631; H04L 51/24; H04L 63/0892; H04L 65/403

USPC .................................................. 709/206, 207
See application file for complete search history.

(56) References Cited

U.S. PATENT DOCUMENTS

| 5,708,422 | A | 1/1998 | Blonder | |
|---|---|---|---|---|
| 8,024,271 | B2 | 9/2011 | Grant | |
| 8,375,096 | B2 * | 2/2013 | Carlson et al. | 709/206 |
| 8,572,173 | B2 * | 10/2013 | Briere et al. | 709/204 |
| 8,606,911 | B2 * | 12/2013 | Raleigh et al. | 709/224 |
| 8,626,115 | B2 * | 1/2014 | Raleigh et al. | 455/405 |
| 2010/0272114 | A1 * | 10/2010 | Carlson et al. | 370/401 |
| 2010/0274688 | A1 | 10/2010 | Hammad | |
| 2010/0299249 | A1 | 11/2010 | Carlson | |
| 2011/0055076 | A1 | 3/2011 | Trifiletti et al. | |

FOREIGN PATENT DOCUMENTS

| WO | WO 99/40551 A1 | 8/1999 |
|---|---|---|
| WO | WO 2006/094410 A1 | 9/2006 |
| WO | WO 2011/031419 A2 | 3/2011 |

* cited by examiner

*Primary Examiner* — Kristie Shingles
(74) *Attorney, Agent, or Firm* — Kilpatrick Townsend & Stockton LLP

(57) ABSTRACT

Embodiments of the invention provide an "also notify" feature that allows a user to set up rules to notify a recipient that a transaction was conducted by the user. When a user conducts a transaction using an account associated with a server computer in an alert system, the server computer generates an alert message if a rule is triggered. The alert message is transmitted to the user informing of the transaction. The server computer also notifies a recipient on a platform specified in the triggered rule by the user, using a supplemental alert message.

12 Claims, 13 Drawing Sheets

FIRST DEVICE

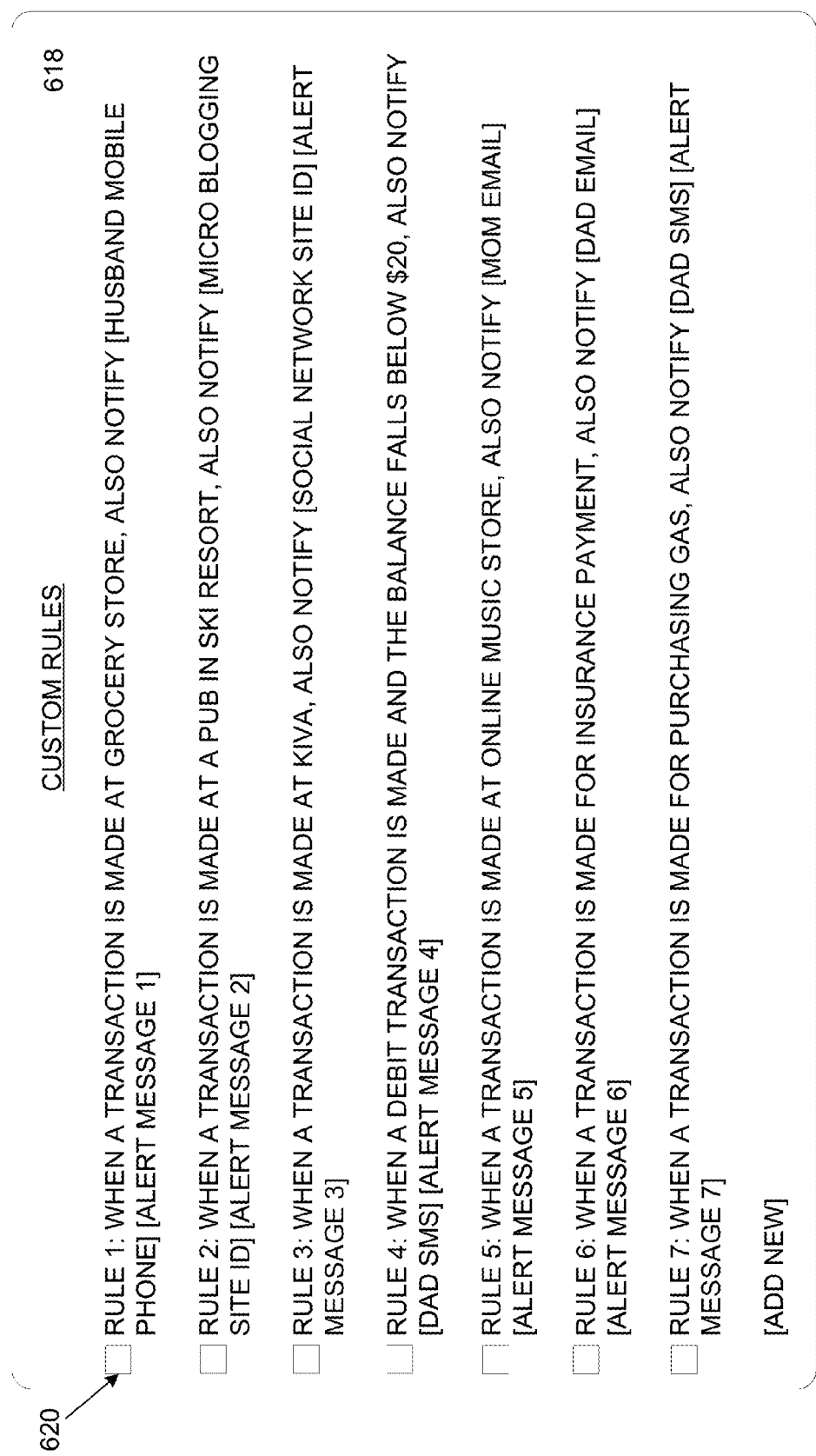

RECIPIENT ALERT MESSAGES                                    624

[ALERT MESSAGE 1]: MEET ME IN THE GARAGE IN 10 MINUTES TO HELP UNLOAD GROCERIES

[ALERT MESSAGE 2]: AT THE PUB, IF YOU WOULD LIKE TO JOIN ME

[ALERT MESSAGE 3]: JUST DONATED $XX TO KIVA, LET ME KNOW IF YOU CAN MATCH ME

[ALERT MESSAGE 4]: BANK BALANCE TOO LOW

[ALERT MESSAGE 5]: JUST BOUGHT SOMETHING AT ONLINE MUSIC STORE, THANKS FOR THE GIFT CARD

[ALERT MESSAGE 6]: MADE AN INSURANCE PAYMENT

[ALERT MESSAGE 7]: GAS PURCHASE FOR $XX, PLEASE SEND MONEY ASAP

[ALERT MESSAGE 8]: A TRANSACTION WAS MADE USING [ACCOUNT NO.] BY RECIPIENT FOR $XX

[ADD NEW]

FIG. 6D

SUPPLEMENTAL ALERT SYSTEM AND METHOD

CROSS-REFERENCES TO RELATED APPLICATIONS

This application is a non-provisional application of and claims the benefit of priority of U.S. Provisional Application No. 61/576,314, filed on Dec. 15, 2011, which is herein incorporated by reference in its entirety for all purposes.

BACKGROUND

When a transaction is conducted by a user using one of the accounts associated with the user, the user may be notified of the transaction in a number of ways. For example, as a result of a transaction conducted at a merchant store (online or point-of-sale), an electronic receipt may be emailed or texted to the user's communication device (mobile device or a personal computer) for notifying the user of the transaction. A notification may be sent to the user informing him of a transaction conducted using an account associated with the user to verify that the transaction is a legitimate transaction.

Typical alert systems send a general alert message to notify a user when a transaction is conducted. Such alert messages could be improved so that recipients other than the user may be notified for quicker communication between the user and the recipients.

Embodiments of the invention provide an improved alert system by providing supplemental alert messages to recipients in addition to providing an alert message to the user when a transaction is conducted by the user.

BRIEF SUMMARY

In some cases, it would be desirable for an entity other than the user to receive a notification when a transaction is conducted by the user. For example, whenever a father deposits money in his son's account, it would be desirable for the son to receive a notification (e.g., an email) automatically that certain amount of money was deposited in his account. In another example, it would be desirable for a business owner to receive a notification whenever an employee conducts a transaction over $100 using a shared business account.

Embodiments of the invention are directed to systems and methods for providing a supplemental alert message to a recipient when a transaction is conducted by a user. A user may enroll in an alert system by registering one or more accounts on a server computer. In one embodiment of the invention, the user may specify rules associated with each of the one or more accounts. The rules may include one or more conditions related to the transactions using one of the accounts. The rules may also include an alert message for transmitting to a recipient if a rule is triggered. When a user conducts a transaction using one of the accounts, a rule may be triggered. As a result, an alert message may be generated by the server computer for the user and a supplemental alert message may be generated by the server computer for a recipient. The contact information of the recipient may be included in the rules.

One embodiment of the invention is directed to a method of receiving an authorization request message at a server computer that is generated in response to a user conducting a transaction. The server computer generates a first alert message based on one or more rules in response to receiving the authorization request message and transmits the first alert message to a first notification device associated with the user, informing the user of the transaction. The server computer also generates a second alert message based upon one or more user specified rules, and transmits the second alert message to a second notification device associated with a message recipient, informing the message recipient of the transaction.

Another embodiment of the invention is directed to a server computer comprising a processor and a non-transitory computer readable storage medium, comprising code executable by the processor for implementing a method of receiving an authorization request message at a server computer that is generated in response to a user conducing a transaction. The server computer is configured to generate a first alert message based on one or more rules in response to receiving the authorization request message and to transmit the first alert message to a first notification device associated with the user, informing the user of the transaction. The server computer is also configured to generate a second alert message, based on one or more rules specified by the user, and to transmit the second alert message to a second notification device associated with a message recipient, informing the message recipient of the transaction.

Another embodiment of the invention is directed to a method of registering one or more accounts associated with a user on a server computer and setting up one or more rules associated with the one or more accounts. The method further comprises conducting a transaction using one of the one or more accounts and receiving a first alert message from the server computer at a first notification device associated with the user in response to conducting the transaction. A second alert message is transmitted by the server computer to a second notification device associated with a message recipient.

These and other embodiments of the invention are described in further detail below with reference to the Figures and the Detailed Description.

BRIEF DESCRIPTION OF THE DRAWINGS

FIG. 6B illustrates an exemplary screen shot with custom rules that can be set up by the user when registering with the supplemental alert system, according to an embodiment of the invention.

FIG. 6D illustrates sample alert messages for the recipients, according to an embodiment of the invention.

DETAILED DESCRIPTION

Figure 1:
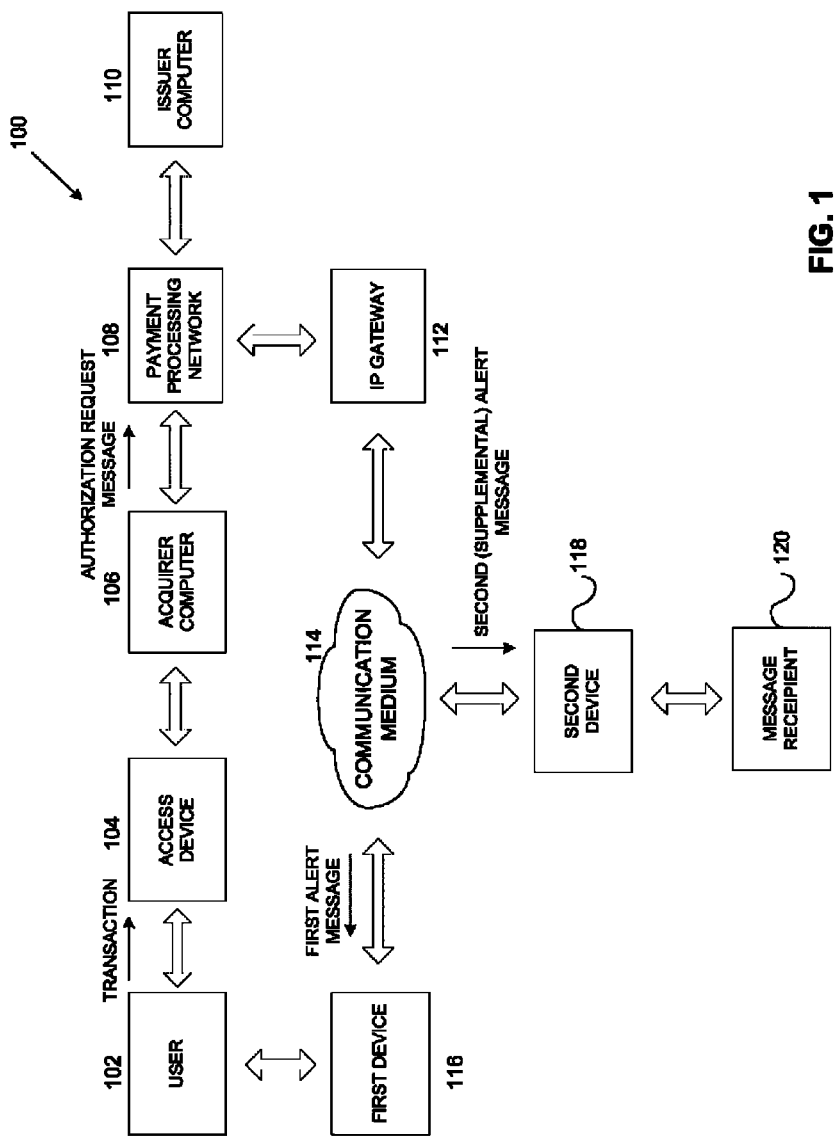
FIG. 1 illustrates an exemplary supplemental alert system for providing transaction based alert messages in accordance with embodiments of the invention.

Prior to discussing embodiments of the invention, description of some terms may be helpful in understanding embodiments of the invention.

A "transaction" may include exchange of data and/or information between two entities. In one embodiment, a transaction may involve a financial account for activities such as, purchasing a product, money transfer, cash withdrawal from a bank account, etc. In some embodiments, a transaction may be conducted online or at a merchant point-of-sale (POS) terminal. The transactions may be conducted using a portable device, such as, mobile device (phone, tablet, PDA, RFID tag), payment card (credit, debit, rewards or loyalty, gift card, etc.) or a personal computer, notebook, etc. In one embodiment, a transaction is conducted when a user swipes a card at a merchant POS terminal to make a purchase. In another embodiment, a transaction is conducted when a user makes a purchase online using a payment account.

An "authorization request message" may include an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

A "server computer" may include a large mainframe, a minicomputer cluster, or a group of servers functioning as a unit. The server computer may be configured to access a database for storing the information, such as accounts, rules, alert messages and any other related information. The server computer may also be configured to generate alert messages when a rule is triggered as a result of a transaction conducted using a particular account. The server computer may also be coupled to an IP gateway in order to communicate with various communication networks (email servers, web servers, mobile device carriers, etc.). The server computer may include any hardware, software, other logic, or combination of the preceding for servicing the requests from one or more client computers.

An "alert message" may also be referred to as a notification and may include any type of electronic communication, or message, generated on the server computer and sent to a user and/or the specified message recipient. In one embodiment, an alert message may be generated based upon user defined rules that are stored on the server computer and compared with relevant transaction data received on the server computer when a transaction is conducted by the user. The alert message may include a text message, an email, a web post, a phone call, etc. A non-limiting example of an alert message may be "a transaction was conducted at grocery store using account no. xxxx-xxxx-xxxx-1234 for $25."

A "rule" may include any type of condition such that when the condition is met it triggers the generation of an alert. In one embodiment, the condition may be pre-defined by the system and elected by the user to be applied to an account associated with the user. Alternatively, or additionally, the condition may be customized and defined entirely by the user and stored in association with that user's account in a database coupled to the server computer. Rules may be modified, deleted or added as needed by the user who has a registered account on the server computer. A non-limiting example of a rule may be "notify dad mobile phone when a transaction is conducted at grocery store."

A "notification device" may include a device capable of receiving, sending and displaying a notification. The notification device may be configured to receive, send and display an electronic communication message, such as, a text message, an image, an email, a web posting. In some embodiments, the notification device may also be able to receive, send and play audio messages. Some non-limiting examples of a notification device include a mobile device (mobile phone, tablet, PDA, etc.), a personal computer, a laptop, a landline phone, etc.

A "user" may include an entity, such as, an individual, capable of conducting a transaction. In some embodiments, the user may be able to use a portable device (payment card, mobile device, etc.) to conduct a transaction online or at a POS terminal. The user may also be able to setup rules for an account associated with an issuer such that a supplemental alert message may be generated to recipients specified in the rules when a transaction is conducted by the user.

A "message recipient" may include an individual, a group of individuals, a business entity, a social networking site (Facebook, Twitter, Google+, etc.) utilizing a platform capable of receiving electronic communication through a notification device. In one embodiment, a message recipient may receive an alert message through a notification device when a transaction is conducted by a user. For example, when a user conducts a transaction for donating money to a charity using a social networking site, contacts (message recipient) of the user on that site may receive a notification of the transaction. Note that user contacts for a social networking site or a messaging service need to be specified by the user as a message recipient, while setting up rules for the related account.

As used herein, an "access device" may include any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

Embodiments of the invention allow users to choose from a plurality of platforms, such as, social networking services, messaging services, micro-blogging, email, text messaging (e.g., SMS), mobile phone, landline phone, and such to connect with other users (friends, co-workers, family, businesses, etc.) in a timely and efficient way. Many users utilize one or more of these platforms for communicating personal, financial and business related information in their day to day tasks. Embodiments of the invention provide an "also notify" feature that allows a user to set up rules to notify a recipient using any such platform that a transaction was conducted by the user. In one embodiment, a user may set up rules associated with one or more accounts registered in an alert system. The user may further customize the alert messages to be transmitted to the specified recipient(s) when a rule is triggered. Customizing the alert messages may include selecting the recipients, their contact information (i.e., email, phone, text message, web post, etc.) and the alert messages for each account associated with the user. When a transaction is conducted by the user using an account registered with the alert system, an alert message may be provided to the user notifying of the transaction and a supplemental alert message may be provided to the specified message recipient notifying of the transaction.

In one embodiment, a user may enroll in an account through a server computer operating a supplemental alert system. The server computer may be associated with an issuer of the account or with a payment processing network. The account may be created upon enrollment or pre-established with the issuer. In one embodiment, the account may refer to any suitable payment account including a credit card account, a checking account, or a prepaid account. The user may define a set of rules for the account where each rule may include one or more conditions. As an example, a condition may be to notify a recipient X when a transaction occurs at a merchant Y using an account Z. In one embodiment, the user may be able to set up different set of rules for each account. A recipient may be notified using a platform (e.g., mobile phone, email, text message, landline phone, social networking services, etc.) that has been selected by the user while setting up the rules. In one embodiment, a different alert message and/or platform is associated with each recipient.

Embodiments of the invention can generate a first alert message and transmit it to a first notification device of a user, and can generate a second alert message and transmit it to a second notification device of a message recipient. The first and second notification messages may include the same information in some embodiments, but can include different information in other embodiments. For example, in one example, a user may conduct a transaction at a grocery store using a payment device such as a credit card. An access device such as a POS terminal may then generate an authorization request message which is then transmitted to a payment processing network and then to an issuer associated with account associated with the credit card. Information in the authorization request message may comprise information including, but not limited to a transaction amount, a merchant identifier, and an account number.

A server computer associated with the payment processing network can then generate a first notification message which may comprise the transaction amount, a merchant identifier, and part of the account number (e.g., the last four digits), and can transmit it to the first notification device operated by the user. The server computer can also generate a second notification message with content that is different than the first notification message. For example, the second notification message may comprise information informing the message recipient to "meet me in the garage in 10 minutes to help unload groceries" to inform the message recipient that he should be ready to assist with unloading groceries.

The content in the second notification message may also be static or dynamic in nature. For instance, in this example, the server computer may retrieve the static message "meet me in the garage in 10 minutes to help unload groceries" after it determines that the transaction is being conducted at a particular grocery store previously specified by the user. In other embodiments, a template such as "meet me in the garage in X minutes" may be retrieved and the time "X" may be determined automatically based in information about the current location of the user's first notification device and the user's home location. That is, an average time to drive between the grocery store and the user's home may be calculated and inserted for the variable "X" in the message "meet me in the garage in X minutes." Thus, embodiments of the invention can be set to send supplemental notification messages to message recipients that have meaning and context that is specifically intended for the message recipient using any platform (social networking services, messaging services, micro-blogging, email, mobile phone, landline phone, etc.).

Any suitable transaction attributes may be used to either trigger or automatically customize second alert messages in embodiments of the invention. Suitable transaction attributes may comprise a transaction amount, a merchant category code, a merchant location, a merchant identifier, an account number, etc.

The second notification messages may also be sent only under certain conditions, and the user may define or select rules relating to the conditions under which such messages may be sent to message recipients. As noted in the grocery purchase example above, second notification messages may only be sent to message recipients if a transaction is conducted by the user using a payment device at a grocery store. In another example, a secondary message may only be sent if the transaction amount only reaches a certain threshold. For example, in some embodiments, the secondary message may only be sent to the second notification device of the message recipient if a transaction amount is over a predetermined amount such as $1000.

In one embodiment, a user may get an alert message on a device as a result of conducting a transaction, along with prompts for the user to select a recipient and a supplemental alert message (free form text or pre-defined) informing the recipient of the transaction. The recipient may be selected from a pre-defined list with their contact information.

FIG. 1 illustrates an exemplary supplemental alert system 100 for providing transaction based alert messages in accordance with embodiments of the invention.

FIG. 1 shows a user 102, which may conduct a transaction at an access device 104 using a payment device (not shown). The access device may be in communication with an acquirer 106, a payment processing network 108, and an issuer computer 110. An IP gateway 112 may be in communication with the payment processing network 108. The IP gateway 112 may be configured to communicate with first and second notification devices 116, 118 via a communication medium 114. A message recipient 120 may operate the second notification device 1180, while the user 102 may operate the first notification device 116.

Acquirer computer 106 is typically a computer operated by an entity (e.g., a bank) that has a business relationship with a particular merchant or other entity. The acquirer computer 106 may route an authorization request message for a transaction conducted by the user 102 to an issuer computer 110 via a payment processing network 108. The payment processing network 108 may include data processing subsystems, networks, and operations used to support and deliver authorization services, and clearing and settlement services. An example of payment processing network 108 includes VisaNet®, operated by Visa®. The payment processing network 108 may include wired or wireless network, including the internet.

The issuer computer 110 is associated with an issuer, which is typically a business entity (e.g., a bank) that may have issued the payment (credit, debit, prepaid, loyalty, etc.) card used for the transaction. Some entities can perform both issuer computer 110 and the acquirer computer 106 functions. The issuer computer 110 may verify the user account and respond with an authorization response message (approved or declined) to the acquirer computer 106 that may be forwarded to a device associated with the user 102.

An IP gateway 112 may be configured to provide communication between the payment processing network 108 and a communication medium 114. The IP gateway 112 may be further operable to communicate with a first device 116 associated with the user 102 and a second device 118 associated with a message recipient 120 using the communication medium 114. The first device 116 may be a mobile device (phone, tablet, PDA, etc.) or a personal computer capable of receiving electronic communications on different platforms (email, text message, web posting, phone, etc.). In one embodiment, the user 102 may conduct a transaction using the first device 116. The first device 116 may be a mobile device (phone, tablet, PDA, etc.) or a personal computer capable of receiving electronic communications on different platforms (email, text message, web posting, phone, etc.).

The communication medium 114 may be able to support multiple platforms and communicatively coupled to mobile carrier networks, email servers, web servers, and public switched telephone network (PSTN), etc. such that a server computer at the IP gateway 112 may be able to transmit a first alert message to the first device 116 and a second alert message to the second device 118 on a platform specified by the user 102. In one embodiment, the platform selected by the user 102 for transmitting the first alert message to the user 102 on the first device (mobile device) may be different than the platform selected by the user for transmitting the second alert message to the message recipient 120 on the second device (personal computer).

The first alert message may inform the user 102 of the transaction and the second alert message may inform the message recipient 120 of the transaction. In one embodiment, the first alert message may inform the user 102 that a particular recipient is informed of the transaction. In some embodiments, the first alert message and the second alert message are sent to the user and the message recipient after the transaction is cleared, i.e., the issuer has approved the authorization request.

Figure 2:
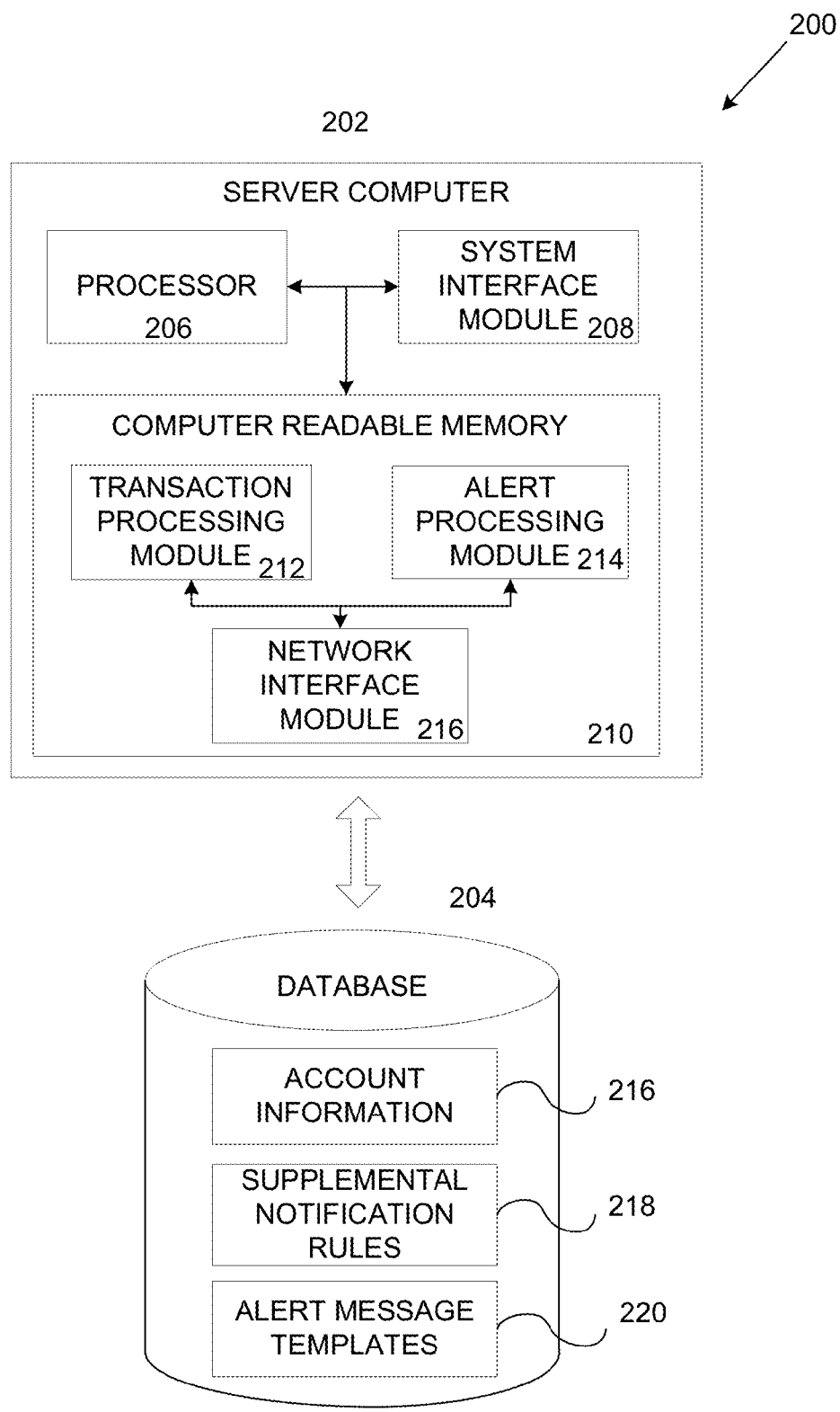
FIG. 2 illustrates certain elements of a server computer communicatively coupled to a database, in accordance with embodiments of the invention.

FIG. 2 illustrates certain elements of a server computer 202 communicatively coupled to a database 204, in accordance with embodiments of the invention. In one embodiment, the database 204 may reside on the server computer 202. The server computer 202 may be associated with the IP gateway 112, the payment processing network 108, the issuer computer 110 or a third party utilized during transaction processing to generate alert messages based on the user defined rules.

In one embodiment, the database 204 may be configured to include account information database 216, supplemental notification rules database 218 and alert message templates database 220. The account information database 216 may include data for a user profile having one or more accounts associated with the user. For example, for each account associated with a user, the account information database 216 may include the account number, user's name, user's address, user's phone number, user's email, user's social security number, and any such relevant data related to the account. In one embodiment, the user profile also may include the contact information of the platform on which the user prefers to receive an alert message as a result of a transaction. In one embodiment, the account information database 216 may also include the message recipient profile having information related to one or more recipients, such as, recipient's name and contact information for different platforms (phone, messaging services, social networking services, etc.) for sending an alert message to the recipient.

The supplemental notification rules database 218 may include data related to the rules for transmitting supplemental notifications when a transaction is conducted using an account linked to the account information 216. In one embodiment, the user may be able to modify the rules stored in the supplemental notification rules database 218 before or after the transaction is conducted. The alert message templates database 220 may include template data for generating alert messages when a rule stored in the supplemental notification rules database 218 may be triggered as a result of a transaction conducted using an account linked to the account information database 216. In one embodiment, the user may be able to modify the alert messages stored in the alert message templates database 220 before or after the transaction is conducted.

As illustrated in the figure, the server computer 202 may include a processor 206 or processing elements that execute instructions or code in order to implement methods, processes or operations in accordance with embodiments of the invention. A system interface module 208 may be configured to communicate with external devices, such as, a display unit, a keypad, external memories, etc. (not shown). A computer readable memory (CRM) 210 may be a non-transitory computer readable storage medium, comprising code executable by the processor 206 for implementing embodiments of the invention. In one embodiment, the CRM 210 may be configured to include a transaction processing module 212, an alert processing module 214 and a network interface module 216.

The network interface module 216 may be configured to receive an authorization request message via IP gateway 112 when a transaction is conducted by the user 102. The transaction processing module 212 may be configured to receive the transaction information associated with the authorization request message via the network interface module 216. In one embodiment, the transaction information may include the information related to the account used in the transaction (e.g., the account number, expiration date, etc.) and the information about the user conducting the transaction (e.g., user name, billing address, SSN, etc.). The transaction processing module 212 may be further configured to compare the relevant data from the transaction information with the related data stored in the account information database 216. If the related account information associated with the authorization request message matches with the account information database 216, a rule stored in the supplemental notification rules database 218 may be triggered. For example, if the account used for conducting the transaction is one of the registered accounts stored in the account information database 216, a rule may be triggered.

The alert processing module 214 may be configured to generate one or more alert messages when a rule is triggered by the transaction processing module 212. The alert message may be generated based on the alert message templates database 220 and the transaction information associated with the authorization request message. A first alert message may be transmitted by the network interface module 216 to the user 102 on a platform specified in the user profile stored in the account information database 216. A second (supplemental) alert message may be transmitted by the network interface module 216 to a recipient on a platform specified in the message recipient profile stored in the account information database 216 using the specified contact information.

Figure 3:
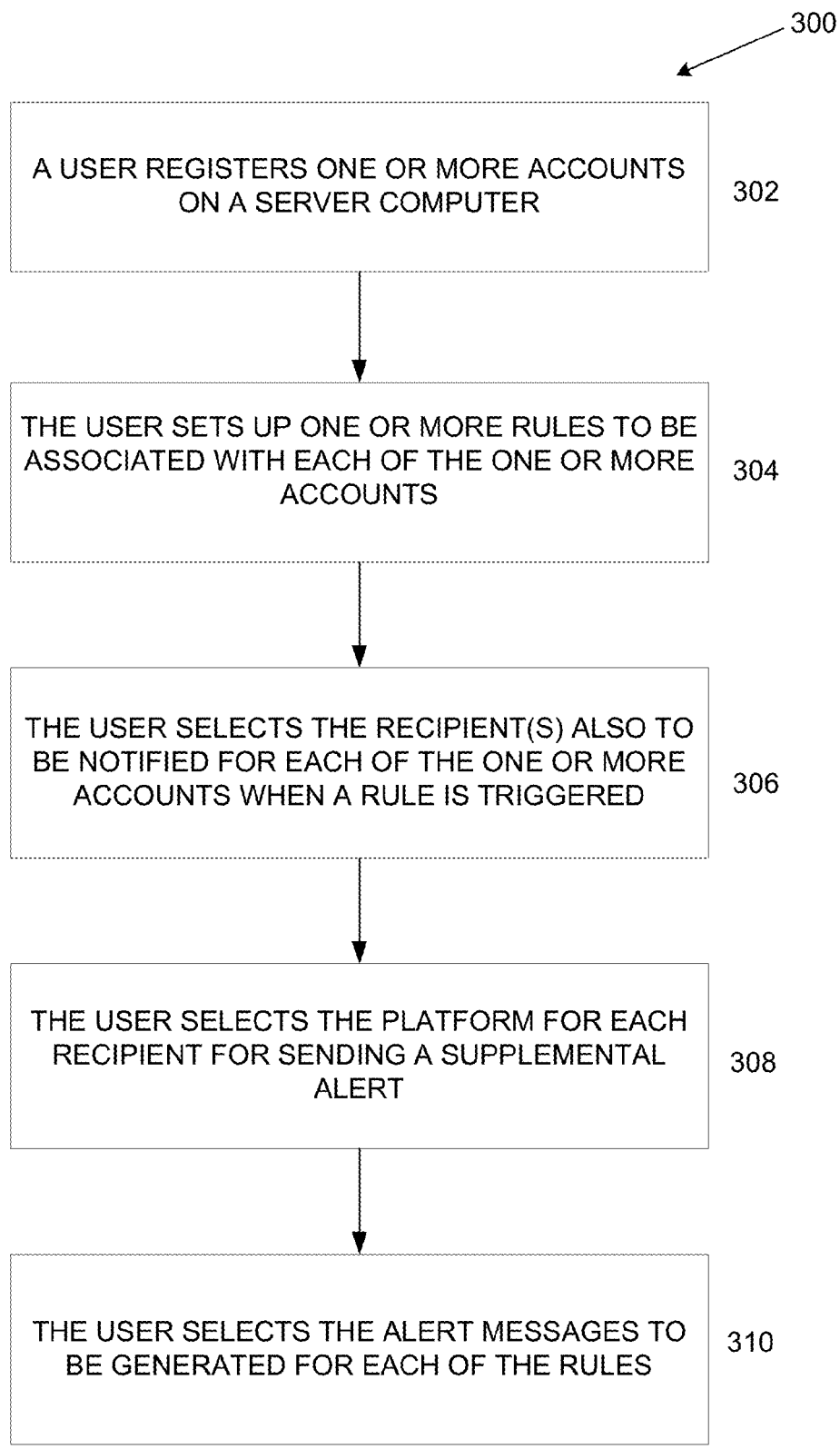
FIG. 3 illustrates an exemplary flow diagram, illustrating a method for performing an embodiment of the invention for setting up rules for generating supplemental alert messages.

FIG. 3 illustrates an exemplary flow diagram, illustrating a method for performing an embodiment of the invention for setting up rules for generating supplemental alert messages.

In step 302, a user registers one or more accounts on a server computer. In one embodiment, the user 102 may register one or more accounts with the server computer 202 that may be associated with the IP gateway 112, the payment processing network 108 or the issuer computer 110 for setting up rules to generate a supplemental alert message when a transaction is conducted using one of the accounts. The account data related to the accounts may be stored in the account information database 216 coupled to the server computer 202. In one embodiment, the user may also specify the platform with the contact information on which the user prefers to receive an alert message while registering for the account.

In step 304, the user may set up one or more rules associated with each of the accounts. The rules may be stored in the supplemental notification rules database 218. The rules may include one or more conditions related to a transaction using an account stored in the account information database 216. For example, one condition may be based on the transaction conducted at a particular merchant. Another condition may be based on the amount of transaction. In one embodiment, one or more rules are setup based on previous transactions conducted using the one or more accounts associated with the user.

In step 306, the user may select the recipient(s) also to be notified for each account when a rule is triggered. The recipient may be one or more individuals, a business or a platform (e.g., a social networking website, a micro-blogging website, etc.). Depending on the type of transaction, the user may choose to select a particular individual, a group of individuals, or a business. For example, for a transaction conducted at a grocery store, the user may want to notify only the spouse or a child. In another example, the user may want to notify a group of individuals if he conducts a transaction at a pub and wants to notify a group of friends to join him at the pub.

In step 308, the user may choose the platform for each recipient for sending a supplemental alert message. The platform may be an email, a phone number, text message or a web post via a social networking site. In one embodiment, a recipient may be an individual when a first rule is triggered (e.g., when a transaction is conducted using account no. 1 at grocery store, also notify the husband via SMS messaging). In another embodiment, a recipient may be a platform when a second rule is triggered (e.g., when a transaction is conducted using account no. 2 at KIVA, also notify Facebook). In this case, the user may choose a group of friends on the social networking website for sending a particular notification message. For different rules, different group of friends may be selected and/or different platforms may be selected. In some embodiments, default recipient information is stored for sending all the alert messages.

In step 310, the user may select an alert message to be generated for each rule. In one embodiment, the user 102 may setup the alert messages based on the templates stored in the alert message template database 220. In another embodiment, the user 102 may customize the alert messages for each rule. In one embodiment, the alert message for the user may be different than the alert message for the recipient.

Figure 4:
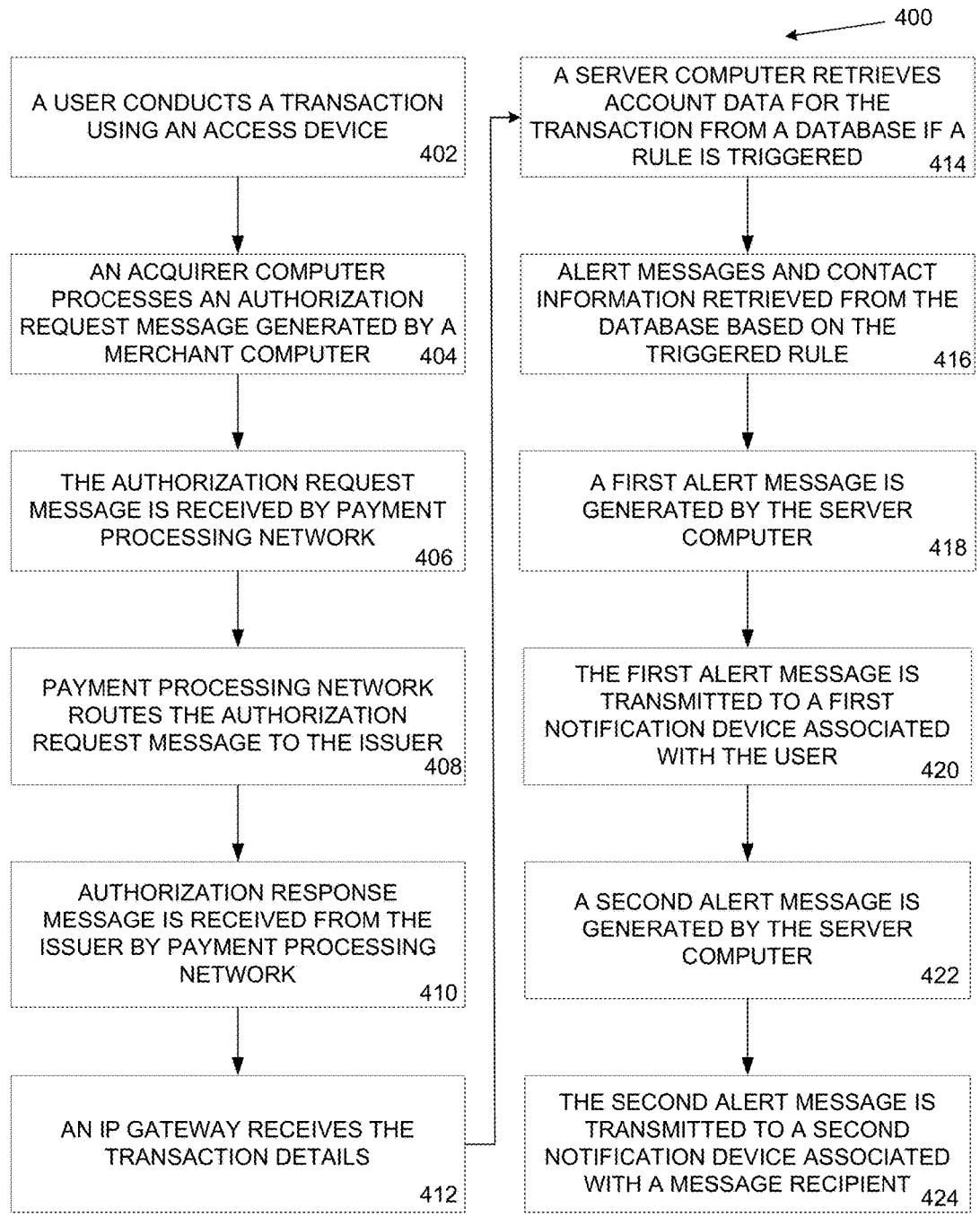
FIG. 4 illustrates an exemplary flow diagram, illustrating a method for performing embodiments of the invention for generating alert messages when a transaction is conducted.

FIG. 4 illustrates an exemplary flow diagram, illustrating a method for performing embodiments of the invention for generating alert messages when a transaction is conducted.

In step 402, a user may conduct a transaction using an access device. The user 102 may use a payment device to conduct the transaction. In embodiments of the invention, the transaction may be an online transaction using the internet or at a POS terminal. In embodiments of the invention, the access device 104 may generate an authorization request message and this information may be transmitted to the acquirer computer 106.

In step 404, the acquirer computer 106 processes the authorization request message received from the merchant computer and forwards it to the payment processing network 108.

In step 406, the authorization request message is received by the payment processing network 108. The payment processing network 108 may be configured to determine the issuer associated with the payment device and forward the authorization request message for the transaction to the issuer computer 110 for verification and authorization in step 408. In some embodiments, if the transaction amount is below certain threshold value, the payment processing network 108 may be configured to authorize the transaction based on the information it has about the user's account without generating and transmitting an authorization request message to the issuer computer 110.

In step 410, the issuer computer 110 processes the authorization request message based on the information associated with the user's account and the transaction data and generates an authorization response message that may include an authorization code indicating the transaction is approved or declined. The issuer computer 110 may forward this authorization response message to the payment processing network 108, which in turn will route it to the merchant computer via the acquirer computer 106.

In step 412, the IP gateway 112 receives the transaction details (e.g., account information, user information, transaction amount, merchant information, etc.). In one embodiment, the IP gateway 112 receives the information in the authorization request message before the transaction is authorized by the issuer computer 110. In another embodiment, the IP gateway 112 receives the authorization request message after the transaction is approved by the issuer computer 110.

In step 414, the server computer 202 retrieves account data for the transaction from the database 204 if a rule is triggered. In this example, the server computer 202 may be located in the IP gateway 112.

In step 416, alert messages and the platform information are retrieved from the database 204 based on the triggered rule. The platform information may include the contact information of the user who conducted the transaction and also the contact information of the recipient. For example, the platform information for the user may include a mobile phone number for sending a text message and the platform information for the recipient may include user IDs for a social networking website as specified in the rule.

Illustratively, a user may be at a sports bar watching a game and wants to pay for a drink using a payment device such as a payment card. An authorization request message for the transaction may be generated by the access device 104. If the payment account used for the transaction by the user at the sports bar is registered with the alert system, a rule may be triggered by the server computer 202. As an example, the rule may be "when a transaction is made at sports bar, also notify [social network website friends]." In one embodiment, the relevant account information for matching the accounts may be based on the user name, zip code, SSN, last four digits (or all digits) of the account number, expiration date, etc.). The server computer 202 may retrieve the relevant data for the account from the database 204.

In step 418, a first alert message is generated by the server computer based on the triggered rule. In one embodiment, the first alert message is generated by the alert processing module 214 using a template stored in the alert message templates database 220. For example, the first alert message to the user may be "transaction conducted at sports bar for $xx". The dollar amount for the transaction may be determined from the transaction data.

In step 420, the first alert message is transmitted by the server computer 200 in the IP gateway 112 to a first notification device 116 associated with the user 102, via the communication medium 114. For example, the first alert message "transaction conducted at sports bar for $xx" may be transmitted as a text message to a mobile device (an example of the first device 116) using a cellular network (an example of the communication medium 114).

In step 422, a second alert message may be generated by the server computer 202. In one embodiment, the second alert message may be generated by the alert processing module 214 using a template stored in the alert message templates database 220. The alert message may be associated with the rule that triggered the alert.

In some embodiments, the alert message may be customized using the alert message templates in the alert message database 220 and information in the transaction data. For example, the second alert message may be "at the sports bar in [location], watching a game". This message may have been previously customized by the user. The location may be determined based on the current location where the transaction was conducted by the user. In one embodiment, the second alert message may be generated by the server computer 202 but not sent to the message recipient until after a pre-determined period of time has expired.

In step 424, the second alert message may be transmitted to a second notification device 118 associated with the message recipient 120 via the communication medium 114. For example, the message "at the sports bar in [location], watching a game" may be transmitted to all the user IDs specified in the rule for the social networking website. In one embodiment, the second alert message may be transmitted to different recipients on different notification devices. For example, a message recipient may receive the supplemental alert message on a mobile device while the other recipient may receive the supplemental alert message on a personal computer. In some embodiments, the second alert message may be sent to the message recipient after a pre-determined number of transactions have occurred or after a pre-determined number of transactions have occurred at a certain merchant. In one embodiment, the message recipient may respond to the user after receiving the second alert message.

Figure 5:
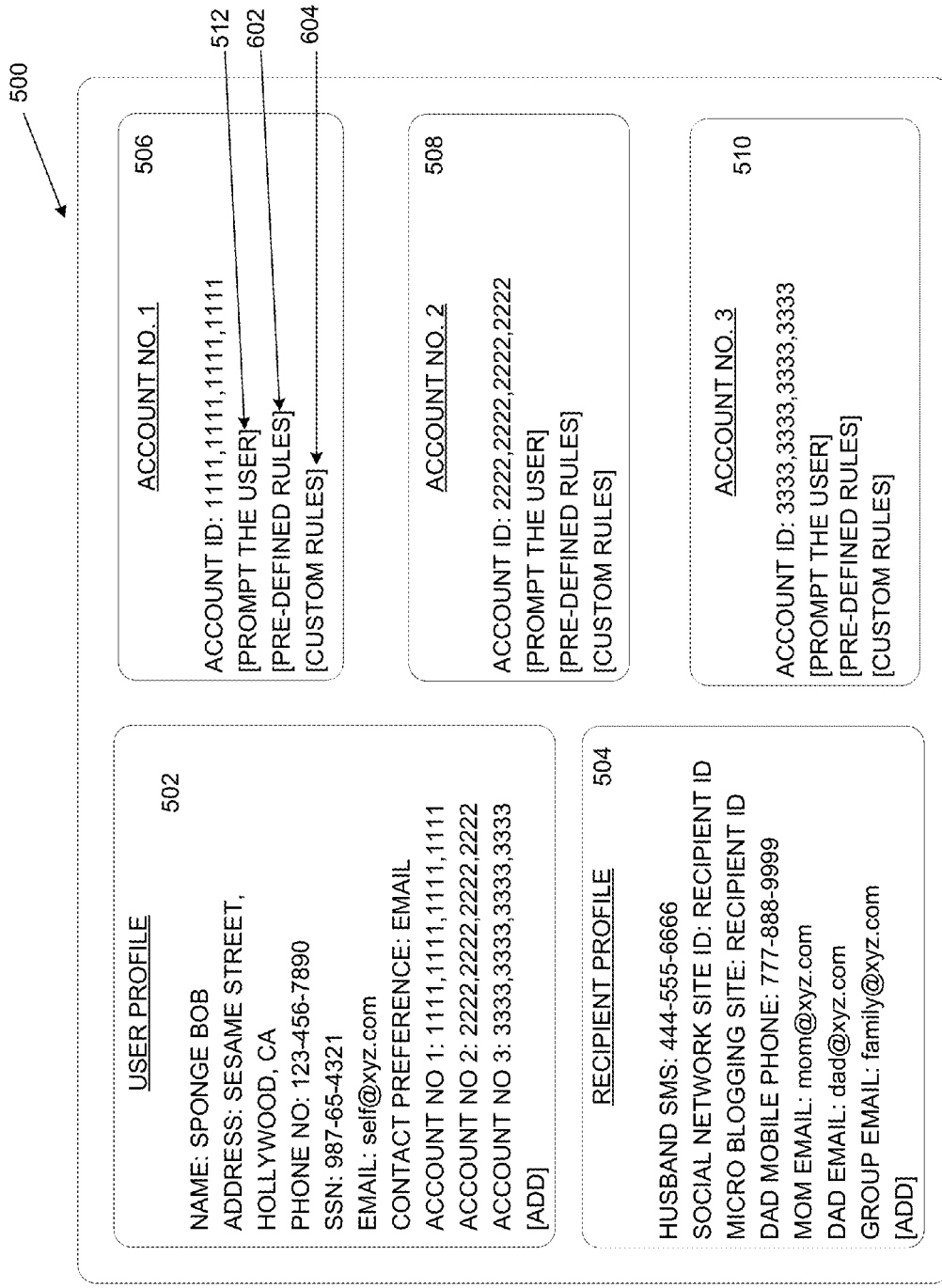
FIG. 5 illustrates an exemplary screen shot for registering an account in an alert system, according to an embodiment of the invention.

FIG. 5 illustrates an exemplary screen shot for registering an account in an alert system.

An exemplary screen shot 500 may include a display window 502 for user profile, a display window 504 for recipient profile, a display window 506 for account no. 1, a display window 508 for account no. 2 and a display window 510 for account no. 3. As part of registering one or more accounts (step 302), the user 102 may have a profile stored on the server computer 202. In some embodiments, the user may need to login to a server computer to access an existing account or open a new account in order to register for the alert system. The user profile may be stored in the account information database 216 with the user's personal information (name, address, email, phone no, SSN, platform preference for receiving alerts, etc.) and financial information (account numbers, expiration dates, billing address, etc.). The user profile may be updated (e.g., change the address, add new accounts, etc.) at any time (before or after the transaction) by the user by logging in to his account on the server computer.

The user may be able to set up the recipient profile in the display window 504. The user may be able to add any number of recipients and their contact information. For any individual (e.g., spouse, dad, mom, child, friend, employee, etc.), one or more platforms may be selected (e.g., phone number, SMS, email). In some embodiments, the recipient may be a group of individuals (e.g., family, friends, and employees).

The display windows 506, 508 and 510 may provide the user 102 options to set up rules and alerts associated with the account no. 1, account no. 2 and account no. 3 respectively. As illustrated in the figure, for each account, the user may select either pre-defined rules using a button 602 and/or define custom rules using a button 604, which are further explained with the help of FIGS. 6A-6D. In one embodiment, if the user chooses to select the option "prompt the user" using a button 512 then all the other rules may be disabled (e.g., buttons 602 and 604 may not be selected). The option 512 may provide the user with an option of choosing a recipient and an alert message when a transaction is conducted by the user. This embodiment is further explained with reference to FIG. 9. It is understood that as new accounts are added or existing accounts are modified (or deleted) in the user profile window 502, it may be reflected in the display windows for the accounts.

Figure 6A:
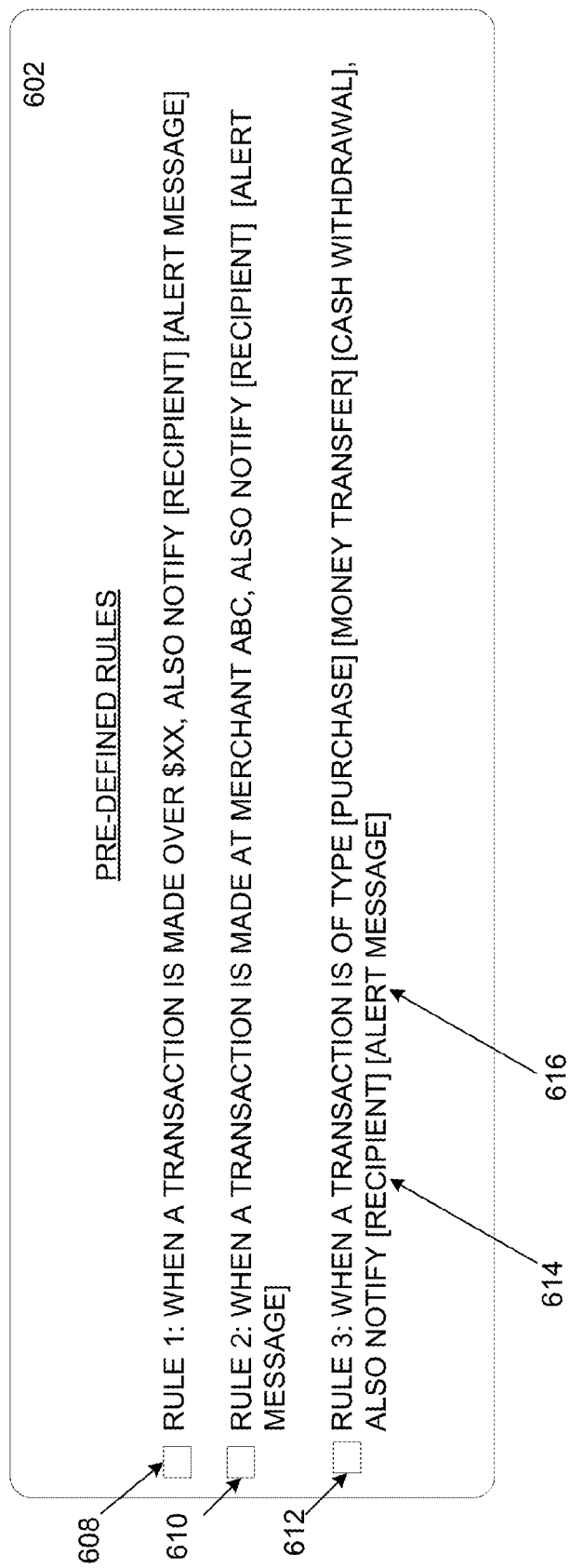
FIG. 6A illustrates an exemplary screen shot with pre-defined rules presented to a user when registering with the supplemental alert system, according to an embodiment of the invention.

FIG. 6A illustrates an exemplary screen shot with pre-defined rules presented to a user when registering with the supplemental alert system.

The pre-defined rules associated with each account may be stored in the supplemental notification rules database 218. As illustrated in the screen shot 602 for pre-defined rules, one or more rules may be selected using buttons associated with the rules. For example, to select rule 3, a button 612 may be selected. By selecting the button 612, the user may be able to select one or more recipients using a link 614 and a recipient alert message using a link 616 for this rule. In one embodiment, the link 614 may give the contact information for each recipient listed in the recipient profile 504. In one embodiment, the link 616 may give the option for the user to choose an alert message from a list of alert messages. A few of the sample alert messages are listed in an exemplary list 624 in FIG. 6D. In some embodiments, pre-defined rules may be classified as default rules for all the accounts.

Referring back to FIG. 6A, if the user chooses to select rule 2 (by selecting a button 610), in one example, the rule 2 may be "when a transaction is made at "grocery store", also notify "husband SMS", "meet me in the garage in 10 minutes to help unload groceries". In some cases, a user may choose to be notified when a shared account is used by other users (for example, spouse, children, and employees). For example, a business owner may like to be notified when an employee using a shared business account conducts a transaction over $50 (by selecting a button 608). In this case, rule 1 may be set up as "when a transaction is made over $50, also notify "business owner", "A transaction was made using account xxxx_xxxx_xxxx_1234 by employee for $55."

FIG. 6B illustrates an exemplary screen shot with custom rules that may be set up by the user when registering with the supplemental alert system.

Custom rules may be set up by the user when registering one or more accounts in the alert system. In one embodiment, a combination of pre-defined rules and custom rules may be selected by the user for generating alert messages. As illustrated in the figure, one or more custom rules may be selected using a button associated with each rule (e.g., button 620). For each rule, a message recipient and an alert message may be selected using the appropriate links. In some cases, new rules may be added by the user as needed and/or the existing rules may be modified. In one embodiment, the recipient may be added from the recipient profile 504. In one embodiment, the alert messages may be selected from recipient alert messages 624, as illustrated in FIG. 6D.

Figure 6C:
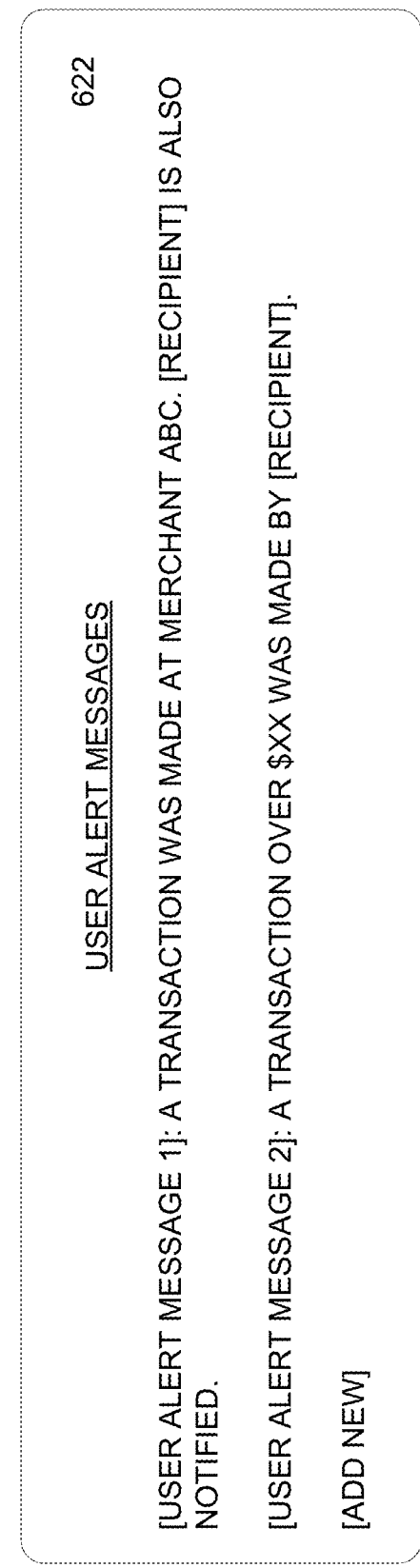
FIG. 6C illustrates sample alert messages for the user, according to an embodiment of the invention.

FIG. 6C illustrates sample user alert messages 622 that may be sent to the user when a rule is triggered. The user may customize the alert messages and add new messages as needed. In one embodiment, the user alert message may be selected by the user when setting up rules. The user alert messages 622 may be stored in the database 204. In one embodiment, the user alert message is the first alert message generated by the server computer 202 and transmitted to the first device 116 associated with the user 102.

FIG. 6D illustrates sample alert messages 624 for the recipients. The user may customize the alert messages and add new messages as needed. Some messages may be customized for notifying a group of people (e.g., using a social networking website, micro-blogging website, email, text messages, etc.) and some other may be customized for individual recipients (e.g., phone message, email, text, etc.). In one embodiment, the user alert message includes a copy of the recipient alert message. In one embodiment, the recipient alert message is the second alert message generated by the server computer 202 and transmitted to the second device 118 associated with the message recipient 120.

Figure 7:
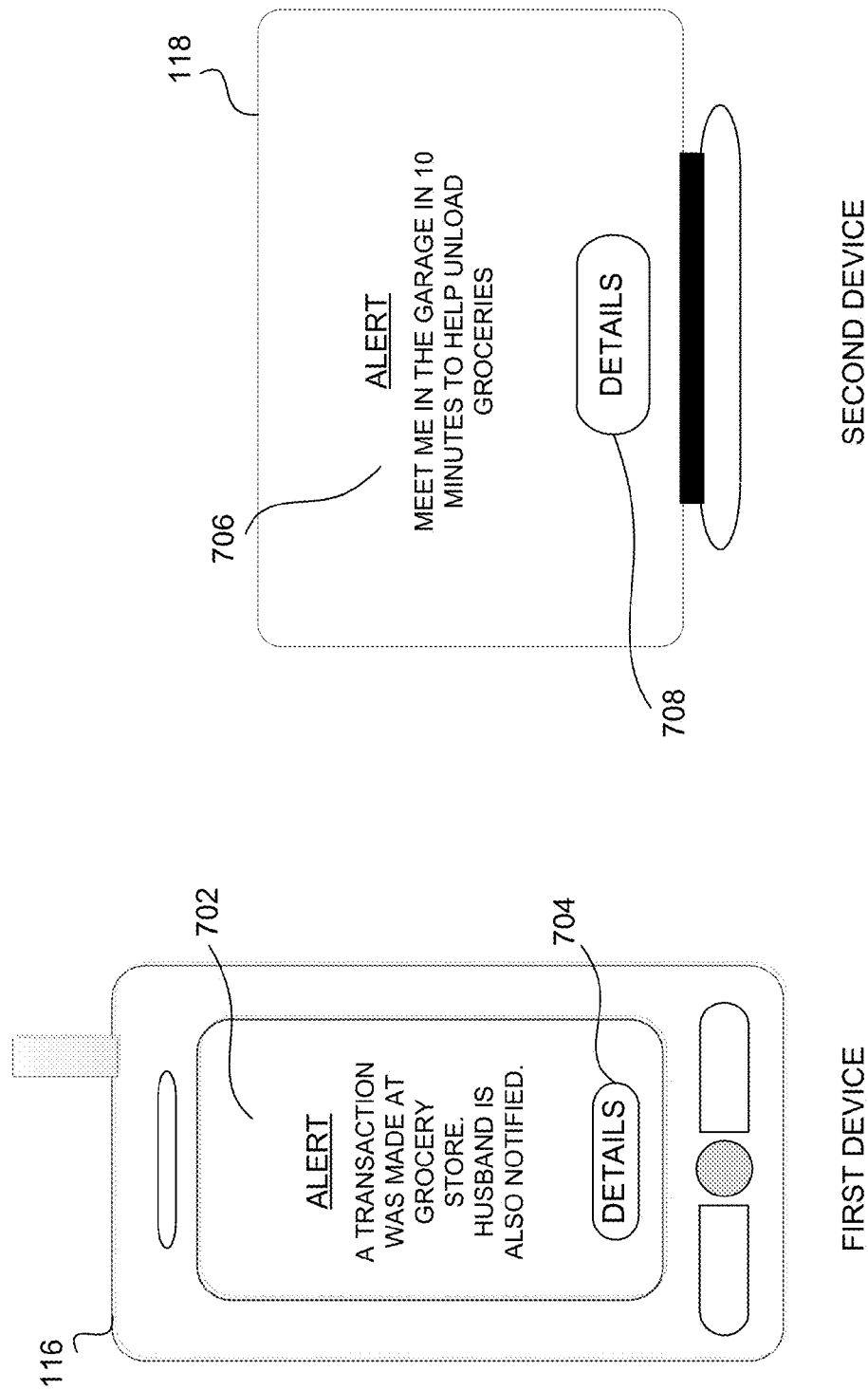
FIG. 7 illustrates an exemplary first alert message on a user's device and an exemplary second alert message on a message recipient's device, according to an embodiment of the invention.

FIG. 7 illustrates an exemplary first alert message on a user's device and an exemplary second alert message on a message recipient's device.

In one example, when a transaction is conducted by the user 102 at a grocery store, an authorization request is received by the server computer 202. If the transaction processing module 212 may determine that the account used in conducting the transaction is one of the registered accounts associated with the user 102 that is stored in the account information database 216, the alert processing module 214 may retrieve the triggered rule's data from the supplemental notification rules database 218. The alert processing module 214 may retrieve the alert messages associated with the triggered rule from the alert messages templates database 220. The user 102 may receive a first alert message 702 on the first device 116 (in this case, a mobile device) displaying "a transaction was made at grocery store. Husband is also notified". A details link 704 may provide the user 102 with the transaction details, such as, the amount of transaction, location where the transaction was conducted, recipient's contact information where the second alert was sent, etc.). A second alert message 706 may be received by the message recipient (in this case, the husband) at the second device 118 (in this case, a personal computer) displaying "meet me in the garage in 10 minutes to help unload groceries". A details link 708 may provide the message recipient details of the transaction that may be different than the details 704. The details link 708 may provide the message recipient the details, such as, where the transaction was conducted, time of the transaction, and any other relevant information.

Figure 8:
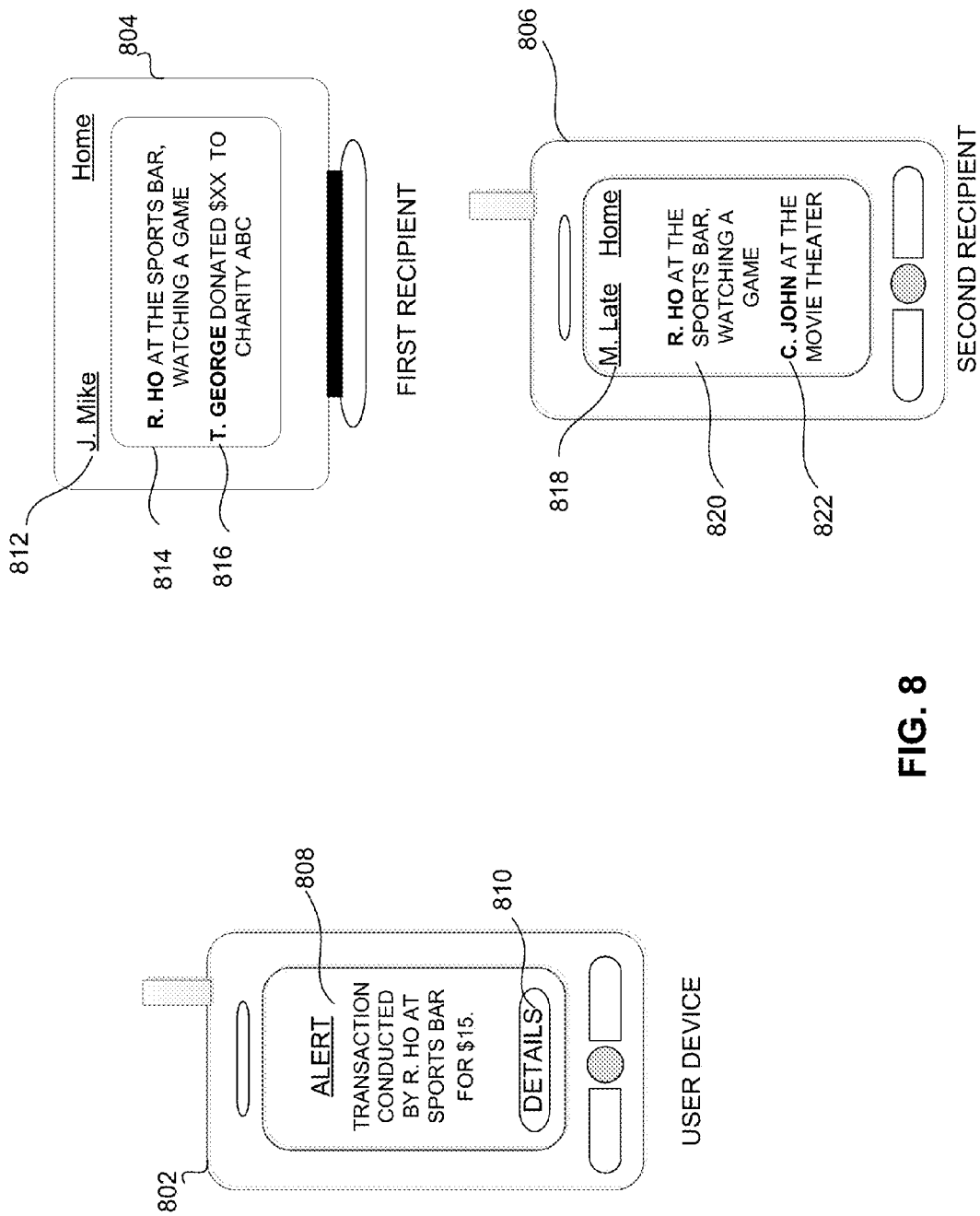
FIG. 8 illustrates an exemplary embodiment with multiple recipients receiving supplemental alert message on a social networking website.

FIG. 8 illustrates an exemplary embodiment with multiple recipients receiving supplemental alert message on a social networking website.

Considering the previous example of a user conducting a transaction at a sports bar, assuming R. Ho conducts a transaction at a sports bar for $15. R. Ho may have setup rules to notify a plurality of recipients (J. Mike and M. Late, in this case) when a transaction is conducted using a particular account at that sports bar. R. Ho may also have specified the platform for J. Mike and M. Late (and any more recipients desired to be notified)) to be a social networking website. In the recipient profile 504, R. Ho may have provided recipient IDs for J. Mike and M. Late for the social networking website. When R. Ho conducts a transaction at that sports bar using the registered account, a first notification message 808 "transaction conducted by R. Ho at sports bar for $15" is transmitted to a notification device 802 (mobile device, in this example) associated with R. Ho. A link 810 may be used by R. Ho to get additional details about the transaction.

As a result of conducting the transaction by R. Ho at the sports bar, a first recipient 812 (J. Mike) may receive a second notification message 814 from R. Ho "At the sports bar, watching a game" on a social networking website on his notification device 804. The notification device 804 may be a laptop. A post 816 from another user (T. George) may be another supplemental message from a transaction conducted by T. George or may be a regular post by T. George.

Further, a second recipient 818 (M. Late) may also receive a second notification message 820 from R. Ho "At the sports bar, watching a game" on the social networking website on his notification device 806. The notification device 806 may be a mobile device. A post 822 from another user (C. John) may be another supplemental message from a transaction conducted by C. John or may be a regular post.

For illustrative purposes, only two recipients are shown, however, it is understood that additional recipients may be added or recipients may be removed as desired. Further, additional recipients may be defined in the user profile for receiving the second alert message on a different platform (e.g., email) for the transaction conducted by the user at the sports bar. Additionally, the contact information related to the user and the recipients may be modified by the user at any time before or after the transaction is conducted.

Figure 9:
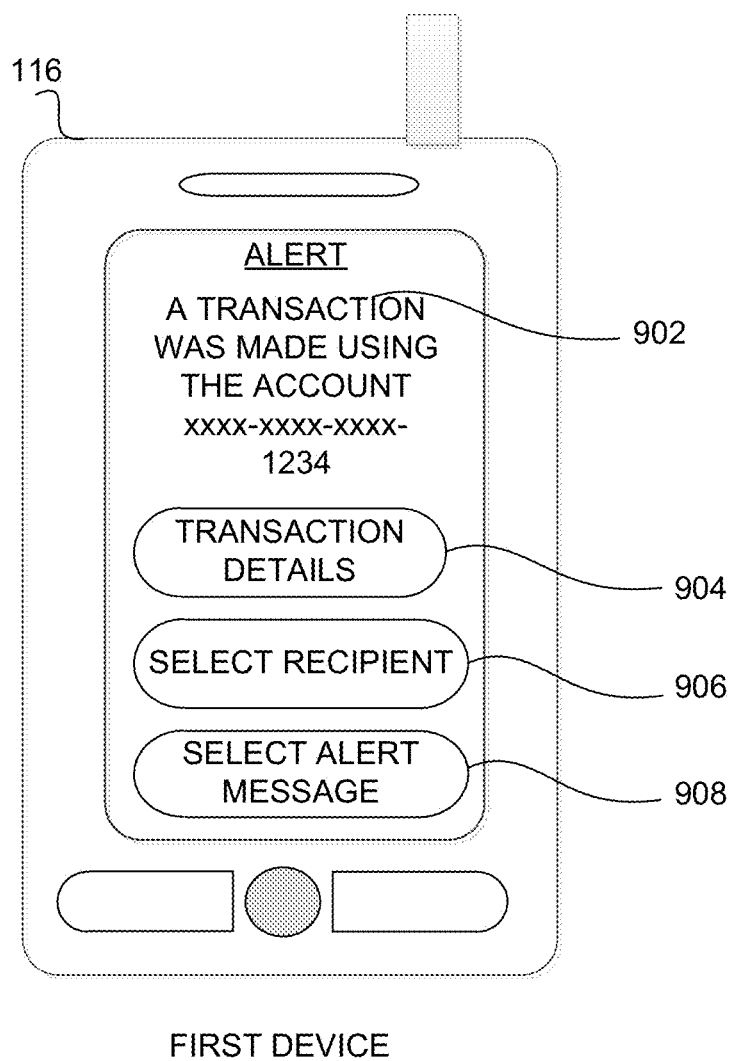
FIG. 9 illustrates an embodiment of the invention that provides the user with an option to choose a recipient and an alert message when a transaction is conducted by the user.

FIG. 9 illustrates an embodiment of the invention that may provide the user with an option to choose a recipient and an alert message when a transaction is conducted by the user.

When a transaction is conducted by the user 102, an alert message 902 may be received by the user 102 on the first device 116 informing of the transaction. In one embodiment, the user is prompted to select a recipient using a select recipient link 906 for sending an alert message using a select alert message link 908. In some embodiments, the recipient may be selected from the recipient profile 504 that may be stored in the account information database 214. An alert message may be selected from the recipient alert messages 624. In some embodiments, the recipient's contact information and the alert message may be keyed in using the first device 116. A transaction details link 904 may provide additional details about the transaction, such as, the amount of transaction, merchant, location where the transaction was conducted, and the time it was conducted.

Embodiments of the invention provide a supplemental alert system and methods for also notifying a recipient in addition to a user when a transaction is conducted by the user. By automatically notifying one or more recipients in response to conducting a transaction, embodiments of the invention provide a time efficient solution over conventional alert systems. Additionally, by supporting multiple platforms on which the recipient may be notified provides flexibility and saves effort by the user and the recipients by having the transaction information readily accessible. Further, some embodiments of the invention may help with detecting fraudulent transactions as the alerts may be transmitted to multiple individuals.

Figure 10:
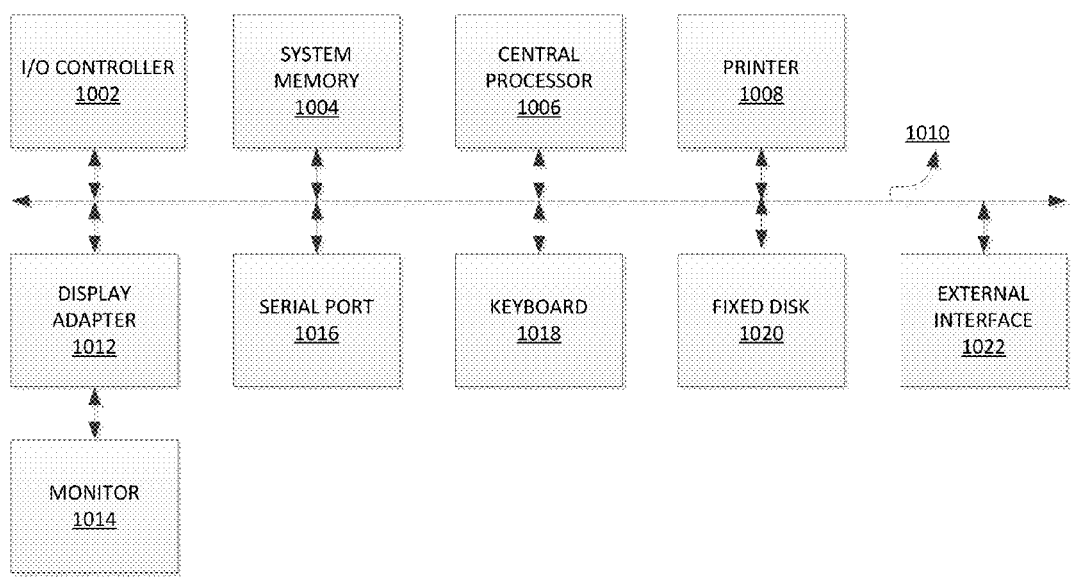
FIG. 10 shows a block diagram of an exemplary computer apparatus that may be used in some embodiments.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 10. The subsystems shown in FIG. 10 are interconnected via a system bus 1010. Additional subsystems such as a printer 1008, keyboard 1018, fixed disk 1020 (or other memory comprising computer readable media), monitor 1014, which is coupled to display adapter 1012, and others are shown. Peripherals and input/output (I/O) devices, which couple to I/O controller 1002, can be connected to the computer system by any number of means known in the art, such as serial port 1016. For example, serial port 1016 or external interface 1022 can be used to connect the computer apparatus to a wide area network such as the Internet, a mouse input device, or a scanner. The interconnection via system bus 1010 allows the central processor 1006 to communicate with each subsystem and to control the execution of instructions from system memory 1004 or the fixed disk 1020, as well as the exchange of information between subsystems. The system memory 1004 and/or the fixed disk 1020 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

One or more features from any embodiment may be combined with one or more features of any other embodiment without departing from the scope of the disclosure.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:

receiving an authorization request message at a server computer, the authorization request message generated in response to a user conducting a transaction, wherein the authorization request message requests authorization for the transaction;

generating a first alert message by the server computer based on one or more rules, in response to receiving the authorization request message;

transmitting, by the server computer, the first alert message to a first notification device associated with the user, the first alert message informing the user of the transaction;

generating a second alert message by the server computer based on one or more rules specified by the user in response to receiving the authorization request message, the second alert message associated with the transaction; and transmitting, by the server computer, the second alert message to a second notification device associated with a message recipient, the second alert message transmitted via a platform specified in the one or more rules, the second alert message informing the message recipient of the transaction, wherein the one or more rules used to generate the second alert message comprise a rule that only generates the second alert message if the authorization request message indicates that the transaction is being conducted at a predetermined merchant category or merchant.

2. The method of claim 1 wherein the second alert message comprises content that is dynamic.

3. The method of claim 1 wherein the platform includes a social networking website.

4. The method of claim 1 wherein the second alert message has a different message than the first alert message.

5. A server computer comprising:

a processor;

a non-transitory computer readable storage medium, comprising code executable by the processor for implementing a method comprising:

receiving an authorization request message, the authorization request message generated in response to a user conducting a transaction, wherein the authorization request message requests authorization for the transaction;

generating a first alert message based on one or more rules, in response to receiving the authorization request message;

transmitting the first alert message to a first notification device associated with the user, the first alert message informing the user of the transaction;

generating a second alert message based on one or more rules specified by the user in response to receiving the authorization request message, the second alert message associated with the transaction; and transmitting the second alert message to a second notification device associated with a message recipient, the second alert message transmitted via a platform specified in the one or more rules, the second alert message informing the message recipient of the transaction,
wherein the second alert message is sent to the message recipient when the transaction is performed using a particular payment account associated with the user.

6. The server computer of claim 5, wherein the authorization request message comprises a payment account number.

7. The server computer of claim 5, wherein the second alert message is sent to the message recipient after a pre-determined period of time.

8. The server computer of claim 5, wherein the second alert message has a different message than the first alert message.

9. A method comprising:
registering one or more accounts associated with a user on a server computer;
setting up one or more rules associated with the one or more accounts;
conducting a transaction using one of the one or more accounts; and
receiving a first alert message from the server computer at a first notification device associated with the user in response to conducting the transaction,
wherein a second alert message is transmitted by the server computer to a second notification device associated with a message recipient in response to the user conducting the transaction, wherein the first alert message and the second alert message comprise different messages,
wherein setting up the one or more rules includes setting up the one or more rules to customize the alert messages transmitted by the server computer.

10. The method of claim 9 wherein the one or more rules can be modified by the user before or after the transaction is conducted.

11. The method of claim 9 wherein the one or more alert messages can be modified by the user before or after the transaction is conducted.

12. The method of claim 9 further comprising:
receiving a response from the message recipient after the message recipient receives the second alert message.

* * * * *